(No Model.)
D. P. JEFFERIES & A. W. GRANT.
RUBBER TIRE FOR WHEELS.
No. 449,650. Patented Mar. 31, 1891.
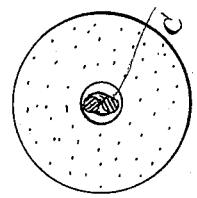
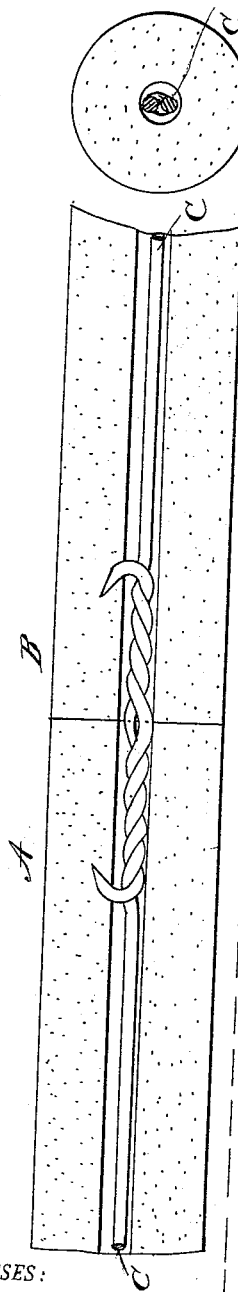
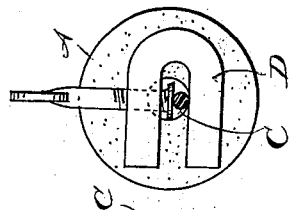
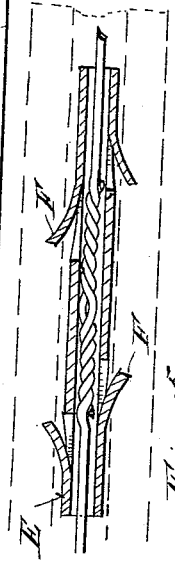
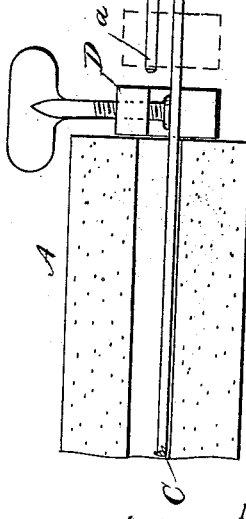
WITNESSES:
H. M. Plaisted.
Warren Hull.
INVENTORS.
Daniel P. Jefferies and
Arthur W. Grant
BY
their ATTORNEY.

UNITED STATES PATENT OFFICE.

DANIEL P. JEFFERIES AND ARTHUR W. GRANT, OF SPRINGFIELD, OHIO.

RUBBER TIRE FOR WHEELS.

SPECIFICATION forming part of Letters Patent No. 449,650, dated March 31, 1891.

Application filed November 14, 1890. Serial No. 371,445. (No model.)

*To all whom it may concern:*

Be it known that we, DANIEL P. JEFFERIES and ARTHUR W. GRANT, citizens of the United States, residing at Springfield, in the county of Clarke and State of Ohio, have invented certain new and useful Improvements in Rubber Tires for Wheels, of which the following is a specification, reference being had therein to the accompanying drawings.

This invention relates to certain new and useful improvements in rubber tires for vehicle-wheels.

Our improvements have reference to means for holding the rubber tire on the wheel-rim; and to this end consist, essentially, of barbs, projections, or spurs carried by the core of the tire and adapted to engage with the rubber part in a direction to prevent the ends of such part from parting or separating, so as to loosen the tire on the rim. It is also preferred that such barbs, projections, or spurs shall admit of forcing the rubber over and past them in a direction to bring the ends of the rubber together.

We have illustrated a preferred and a modified type of construction for carrying our invention into practical operation, and have ascertained the practicability and effectiveness thereof, but wish to be distinctly understood as in no wise limiting ourselves to such types, since many forms of construction will suggest themselves to the skilled mechanic upon the disclosure of the principle of this invention.

In the accompanying drawings, forming a part of this specification, and on which like reference-letters indicate corresponding parts, Figure 1 represents a longitudinal sectional view of a portion of a rubber tire and its metallic core, showing our improvements applied thereto; Fig. 2, a transverse sectional view of the same parts; Fig. 3, a similar view to Fig. 1, save that the ends of the tire are separated and the core has not had its ends interconnected, clamps being shown in connection with said parts; Fig. 4, a sectional view looking at one end of the tire and the side of a clamp with the core in section, and Fig. 5 a modified form of making the barbs.

The letters A and B designate the meeting ends of an india-rubber tire of the ordinary or any approved type or kind, the one illustrated being designed to be fitted in the concave metallic rim of a wheel. In Fig. 3 these ends are shown as somewhat separated. A continuous wire core C is passed through a longitudinal hole in the center of the tire. The rubber is pressed back at each end, so as to expose the connecting portions of the core, and clamps D are applied to the projecting portion of the core, so as to hold the rubber back from the ends. Thus the two ends of the core are presented side by side. This done, they are clamped to each other near the terminus of each end, say, by a vise or other convenient tool. (Suggested in dotted lines.) The part between the clamps or vises is then twisted, as by the tool suggested in dotted lines. When the ends are thus twisted, the vise or other form of clamp is released and the tool withdrawn. The projecting portions (designated $a$ and $b$) are then bent toward each other and properly sharpened or beveled. This is one way of uniting the core and of producing the barbs, as shown in Fig. 1. These operations having been accomplished, the clamps are also removed, when the rubber tire moves up against the barbs and is worked over them, the ends being pressed toward each other until they meet in firm contact. The barbs immediately take into the rubber and enter it more or less, according to the length of the barbs, and hold the ends from separating. Thus the ends of the core are interconnected and the barbs provided, the barbs being in the example shown and described integral with the core and occupying a position at the ends of the twisted portion of the core. This construction is recommended for its simplicity, convenience, and efficiency, though, as before stated, the barbs may be otherwise produced. The completed tire with its core is then applied to the wheel-rim by shop expedients known to those engaged in the art of making wheels, but having no reference to this invention.

Referring to Fig. 5 it will be seen that the ends of the core are merely twisted together to unite them, while a tube E is slipped over the twisted portions and has struck up therefrom barbs F. In this case the barbs are not carried directly by the core, while in Fig. 1 they are so carried. Whether, therefore, the barbs be carried by a separate piece, which laps across the joint in the tire, or by the core itself, is not material. It will be observed, however, that in either case, the barbs on one side of the joint in the tire are connected to the barbs on the other side of the joint, so that the ends of the tire cannot separate. Whatever the character of the interconnection between the barbs is not material, so long as those on one side of a joint cannot be carried away from those on the other side of the joint in a manner to admit of separating the ends of the tire by separating the sets of barbs.

Having thus fully described our invention, what we claim as new, and desire to secure by Letters Patent, is—

1. The combination, with a yielding wheel-tire having interior passages in its adjoining ends, of an interior core adapted to fit in said passages and provided with barbs, spurs, or projections, whereby the said adjoining ends may be slipped over the core and be held in their adjoining position by said barbs, spurs, or projections.

2. The combination, with a rubber wheel-tire having a longitudinal opening therein, of a wire core fitted into the said opening, the ends of the core being overlapped and twisted together and the extreme terminations bent toward each other and sharpened to form spurs, barbs, or projections, over which the tire can be pressed to bring its ends together and which prevent the separation of said ends.

3. The combination, with a yielding wheel-tire, of overlapping wires having barbs, spurs, or projections adapted to engage with said tire and connected by being twisted in opposite directions from a point intermediate of their ends.

4. The combination, with a yielding wheel-tire, of a plain wire core for said tire and of a constant length after the connection of its joining ends, and barbs, spurs, or projections carried by said core near the adjoining ends of the said tire and adapted to penetrate the tire to prevent the separation of the said adjoining ends.

5. The combination, with a yielding wheel-tire and a wire core running therethrough, the ends of the wire being lapped and twisted together and the extreme terminations bent to form barbs, spurs, or projections adapted to engage with the tire to prevent the separation of the adjoining ends thereof.

In testimony whereof we affix our signatures in presence of two witnesses.

DANIEL P. JEFFERIES.
ARTHUR W. GRANT.

Witnesses:
M. I. BURNHAM,
WARREN HULL.